United States Patent [19]

Helsel et al.

[11] Patent Number: 5,668,964
[45] Date of Patent: Sep. 16, 1997

[54] GRAPHICAL USER INTERFACE FOR CREATING A NEW NOTEBOOK WITH A DRAGGED PAGE

[75] Inventors: Brett L. Helsel; Jay R. Gindin, both of Woodinville; John P. Lemire, Duvall; Patrick D. Jenny, Redmond; Mark A. Mortensen, Mercer Island, all of Wash.

[73] Assignee: Wall Data Incorporated, Kirkland, Wash.

[21] Appl. No.: 518,914

[22] Filed: Aug. 24, 1995

[51] Int. Cl.⁶ ........................................ G06F 3/00
[52] U.S. Cl. ................... 395/350; 345/334; 345/340
[58] Field of Search ................... 395/326–358; 345/117–120; 370/62

[56] References Cited

U.S. PATENT DOCUMENTS

| | | | |
|---|---|---|---|
| 5,021,989 | 6/1991 | Fujisawa et al. | 395/350 |
| 5,140,678 | 8/1992 | Torres | 395/350 |
| 5,202,828 | 4/1993 | Vertelney et al. | 395/340 |
| 5,237,651 | 8/1993 | Randall | 395/350 |
| 5,283,864 | 2/1994 | Knowlton | 395/350 |
| 5,367,623 | 11/1994 | Iwai et al. | 395/350 |
| 5,388,202 | 2/1995 | Squires | 395/334 X |
| 5,392,387 | 2/1995 | Fitzpatrick et al. | 395/350 X |
| 5,408,470 | 4/1995 | Rothrock et al. | 370/62 |
| 5,420,040 | 5/1995 | Chang et al. | 395/348 |
| 5,438,662 | 8/1995 | Randall | 395/350 |
| 5,442,795 | 8/1995 | Levine et al. | 395/348 |
| 5,463,725 | 10/1995 | Henckel et al. | 395/350 |
| 5,502,805 | 3/1996 | Anderson et al. | 395/340 X |
| 5,559,936 | 9/1996 | Porter | 395/334 X |

OTHER PUBLICATIONS

Rogers, "NoteMaker: A Hyper–Design Notebook to Support Informal Communication in the Engineering Design Process", IPCC '91, pp. 141–144 1991.

*OLE Documents: Technical Backgrounder*, Microsoft Corporation, May 1994, pp. 1–19.

*Expand Your Apps with OLE 2.0*, Smart Access (Pinnacle Publishing) Roger Jennings, Microsoft Corporation 1995, pp. 1–19.

*Primary Examiner*—John E. Breene
*Attorney, Agent, or Firm*—Christensen O'Connor Johnson & Kindness PLLC

[57] ABSTRACT

A graphical user interface designed as a notebook with tabs used to control operation of multiple applications and multiple operations within the applications. Each page of a notebook represents a different application all within an Object Linking and Embedding (OLE 2.0™) environment. Each page has an associated tab that is used to access the application by clicking on it. A dragging feature allows a user to drag an entire application from one notebook to a second notebook without closing that application. Also this application can be dragged to the desktop and placed in new folder or thrown away. There also are design features which allow the user to change the look of the notebook.

18 Claims, 11 Drawing Sheets

GRAPHICAL USER INTERFACE FOR CREATING A NEW NOTEBOOK WITH A DRAGGED PAGE

FIELD OF THE INVENTION

The present invention is directed towards a graphical user interface and, more particularly, to a graphical user interface using a notebook paradigm.

BACKGROUND OF THE INVENTION

Graphical user interfaces (GUIs) are commonplace in user/computer communication. Some examples of GUIs are Microsoft Windows™ and Apple Macintosh®. In these GUIs, icons represent software applications or other computer functionality. The principal aim of a GUI is to allow a human user to easily manipulate the computer to perform desired tasks. Although the use of icons to represent software applications is widely accepted and was a significant advance over command-based interfaces such as MS-DOS®, it is apparent that many novice or casual users of computers are still intimidated by the computer. It has been found that computer users desire a computer GUI that emulates as much as possible a real-life analog. This is achieved to some extent in present day GUIs by the use of "file cabinet" icons in the Microsoft Windows™ or Apple Macintosh®.

With the advent of object linking and embedding (OLE 2.0™), GUIs have the potential to be more complex. OLE 2.0™ is a programming tool from Microsoft, Inc. that defines a standard model for creating software objects and also for communicating between software objects. OLE 2.0™ allows a user to drag an object from one application (server) and drop it into another application (OLE container). For example, a user can drag an OLE Paintbrush picture (server) into an OLE Excel™ program (container). For more information on OLE 2.0™, the reader is invited to refer to *Inside OLE 2.0*, Microsoft Press (1994).

However, in OLE 2.0™, communication between two containers is limited to extracting specific data via a clipboard. For example, if a user drags data from an OLE container and places it in another OLE container, only the data is moved. This is comparable to the Cut and Paste operations in standard word processors. This does not allow for the dragging of an entire software application from one container to another container.

Also in OLE 2.0™, the user has the ability to designate the contents of the container, but a user cannot manipulate the appearance of the container on the screen. Some designers have allowed for minor manipulation of the tabs, but the prior art does not have the capability of changing the container, and in the case of a notebook-type container, change the binder and tab style and location as well as the paper's texture, of the notebook.

SUMMARY OF THE INVENTION

The present invention provides a GUI that uses the paradigm of a notebook. The notebook appears on the computer display as a notebook with a binder, tabs, and cover. The notebook is a container formed in the OLE standard. Software applications held within the notebook are indicated as tabs to "pages" of the notebook. To access a particular application, the user clicks on the tab representing the application.

In accordance with other aspects of the present invention, the user can transfer applications between two or more notebooks. The user first builds the contents of a first notebook. The contents of a notebook are software applications that are linked or embedded in the container. Each application is also referred to as a page in the notebook. Each page is created with its own user definable tab. Each notebook may have multiple applications (or pages) loaded at one time with the application on top running. In order for the user to drag an application from the first notebook and place it into a second notebook, the desired page must first be placed on top by the user selecting the corresponding tab of the page desired to be dragged. Then the user must activate the cursor with the user input device when it is within the boundary of the notebook but outside of the boundary of the running application. If the cursor is activated when it is within the boundary of the application, then the command structure will place the system in the mode of interacting with that application and not allow for the drag operation to occur.

Once the page is selected, the user drags it to a location outside of the boundary of the window containing the first notebook and within the boundary of the second notebook or to any place on the Windows™ desktop. When the drag operation is complete, the first notebook will have erased the page and tab that contained the running application, while the second notebook will create a page for the new application with the same identifier tab from the first notebook. The binder,. page and tab design of the page containing the application will assume that of the second notebook.

It is another embodiment of the present invention to allow the user to drag an application from a notebook to the desktop therefore creating a new notebook with that dragged application inside of it. In this case, the binder, page, and tab design of the page containing the application will remain the same in the new notebook or take on the default design.

In accordance with other aspects of the present invention, dragging the application and dropping it on a trash can icon will discard the application.

In accordance with other aspects of the present invention, the look of the displayed notebook is redefinable by the user. The styles of the binder and tabs, the texture of the sheets and also the edge where the binder and tabs shall appear are also changeable by the user.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
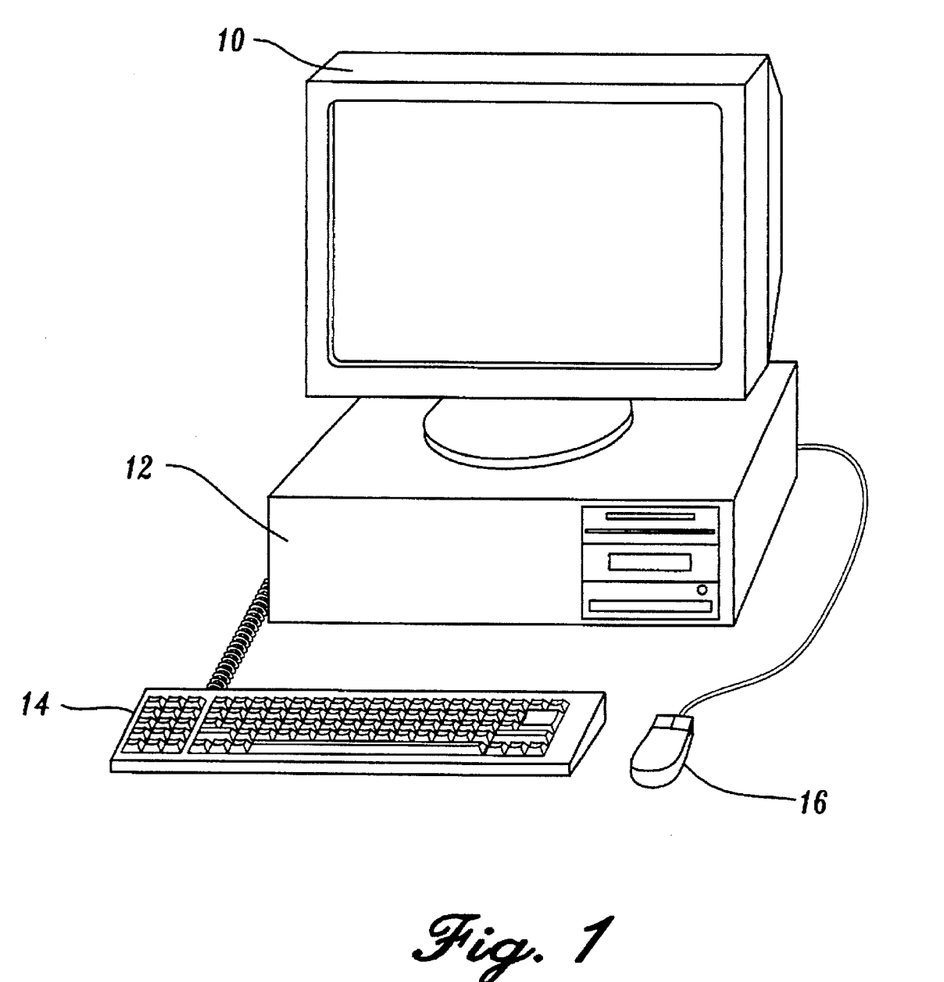
FIG. 1 is a schematic diagram of a personal computer that is capable of implementing the graphical user interface employing the present invention.

FIG. 1 is a schematic diagram of the type of computer system that uses the graphical user interface of the present invention. This system operates in a Windows™ environment. In the preferred embodiment, the CPU 12 is an IBM™ compatible or Apple™ personal computer that have a variety of application software running thereon, such as Excel™, Microsoft Word™ or Rumba Office™. The user interacts with the CPU 12 through the keyboard 14 and the mouse 16. The display 10 presents the GUI of the present invention.

Figure 2:
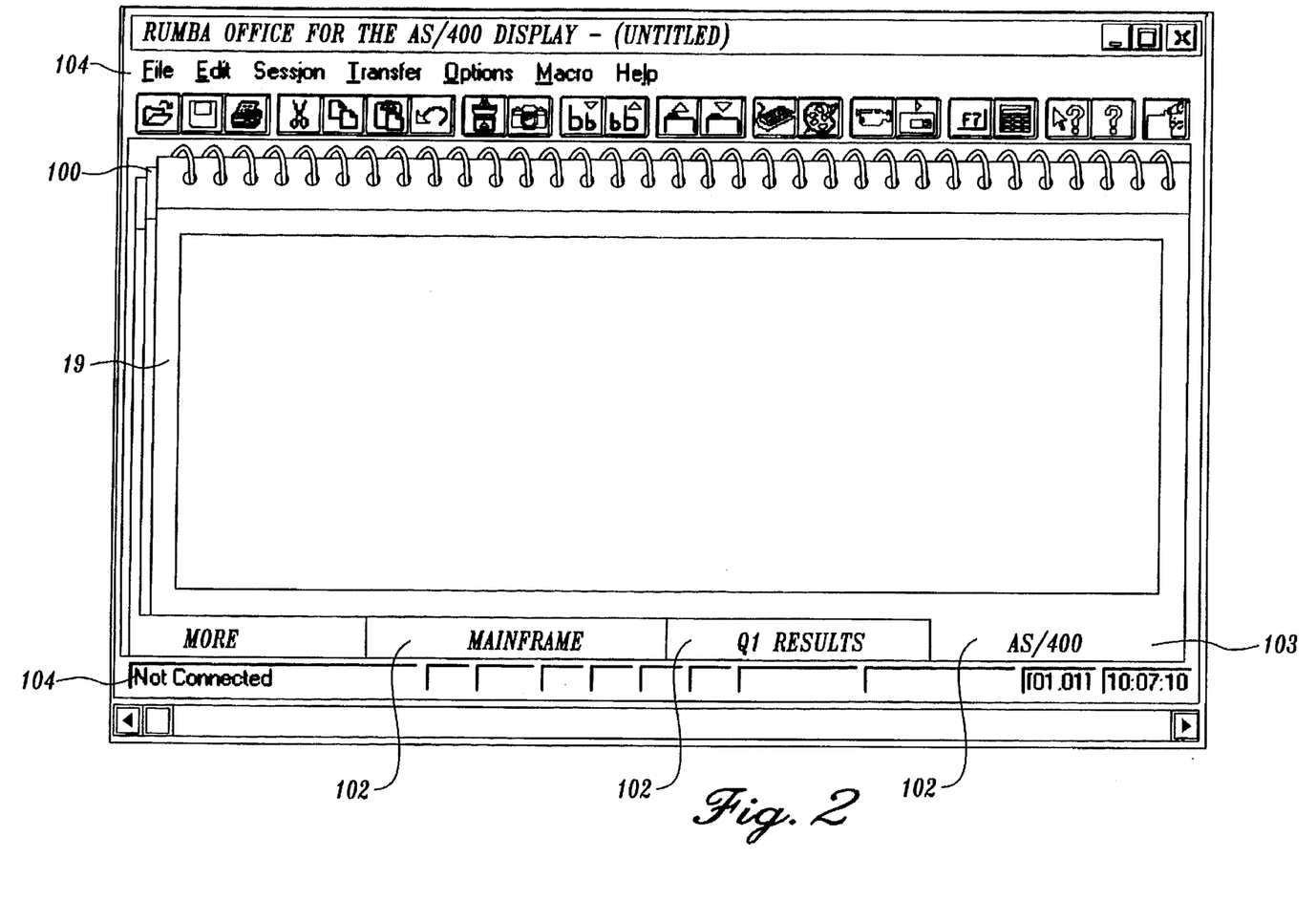
FIG. 2 is a representation of a notebook formed in accordance with the present invention.

FIG. 2 is a graphical representation of a notebook 100 used by the present invention in a Windows™ environment. The notebook 100 in this environment has one or more software applications 102 contained therein. Each application is presented on a separate page 101 of this notebook. Using the features presently available in OLE 2.0™ software, the user determines what applications are entered into the notebook 100 as pages 101. The application that is displayed on the top page of FIG. 2 is a Rumba AS/400 session. This session is running within the page identified by the tab 103 labeled "AS/400". The interaction bars 104 (menu, tool, caption and status) as shown correspond to this Rumba session.

If the user were to display one of the other pages in order to operate the application thereon, the user only needs to select the tab that identifies that page. When this user selection is made, the interaction bars 104 will correspond to the application now running. The user also has the option of determining what text will be displayed in the tab.

FIGS. 3A–3D, show some different styles of binders 105–108 a user can select from. Some available styles are "cheap plastic," see FIGS. 3A and 3D, "wire spirals," see FIG. 3B, and "three-hole," see FIG. 3C. The location of the binders on the notebook is also determined by the user. The user may choose from left, right, top or bottom, to allow for the user's personal preference. The displayed windows that contain these user selectable features are placed in the dropdown menus of the interaction bars 104 of the window containing the notebook 100.

The graphical display of the tabs are also configurable by the user. There are several different predetermined styles to choose from, see FIGS. 3A–3D. In particular, the user can use a dropdown menu to choose from a variety of tab styles stored within the memory of the personal computer. The tab's location is another feature that is determined by the user. Again, the location can be chosen by the user by using a dropdown menu to choose from a number of predetermined locations. However, the location of the tabs cannot coincide with the location of the binder.

Another important consideration is the handling of several tabs where all of the tabs will not fit within the border of the notebook. If there is insufficient room in the notebook to display all the tabs, then a tab is provided that acts as a "scrolling" tab. In the preferred embodiment, a "MORE" tab will indicate that more tabs (containing more software applications) are available, as shown in FIG. 2. Clicking on this "MORE" tab will allow the user to access the other tabs.

Figure 3A:
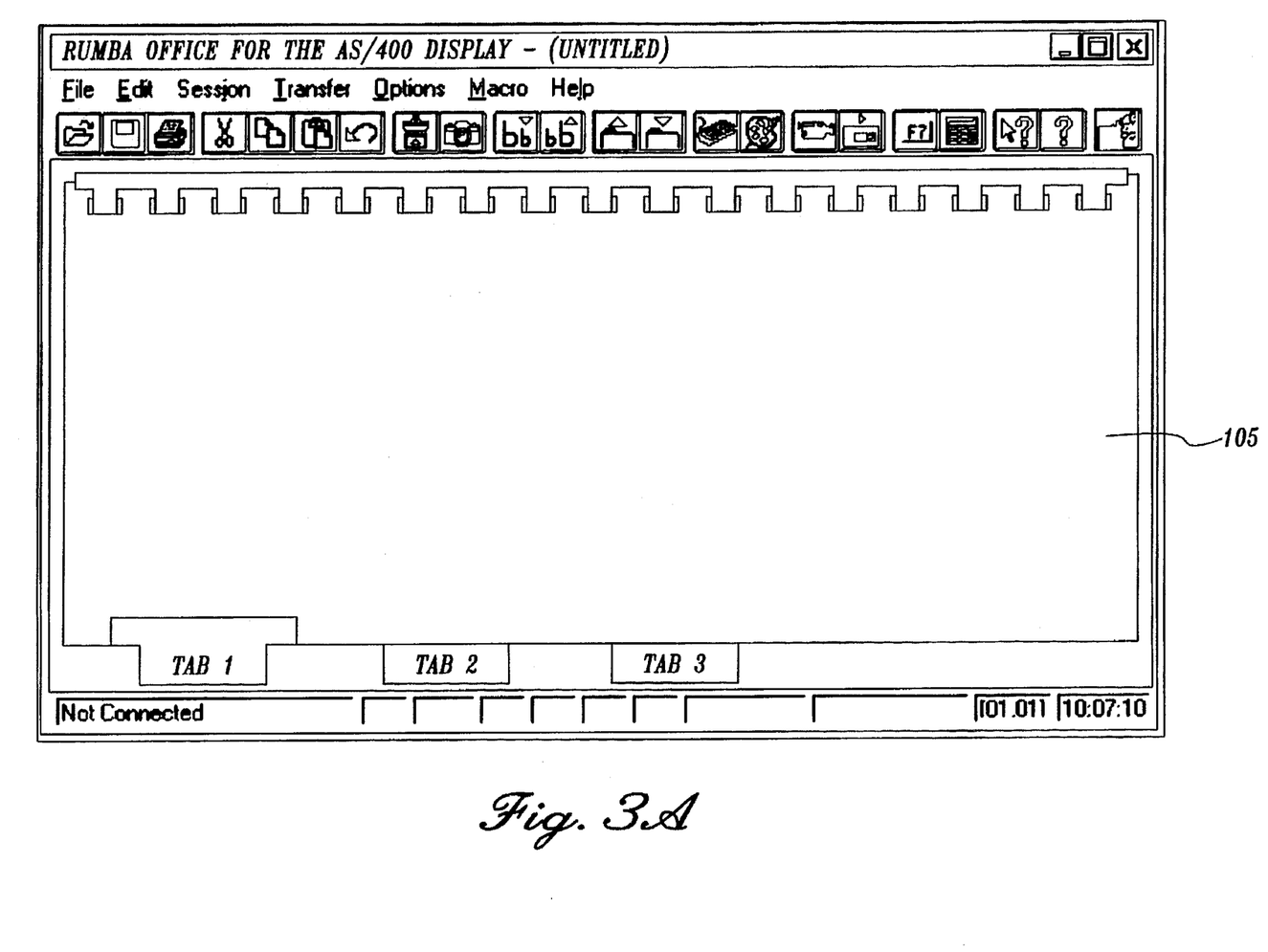
FIGS. 3A–3D are screen displays of different styles of notebooks formed in accordance with the present invention.
Figure 3B:
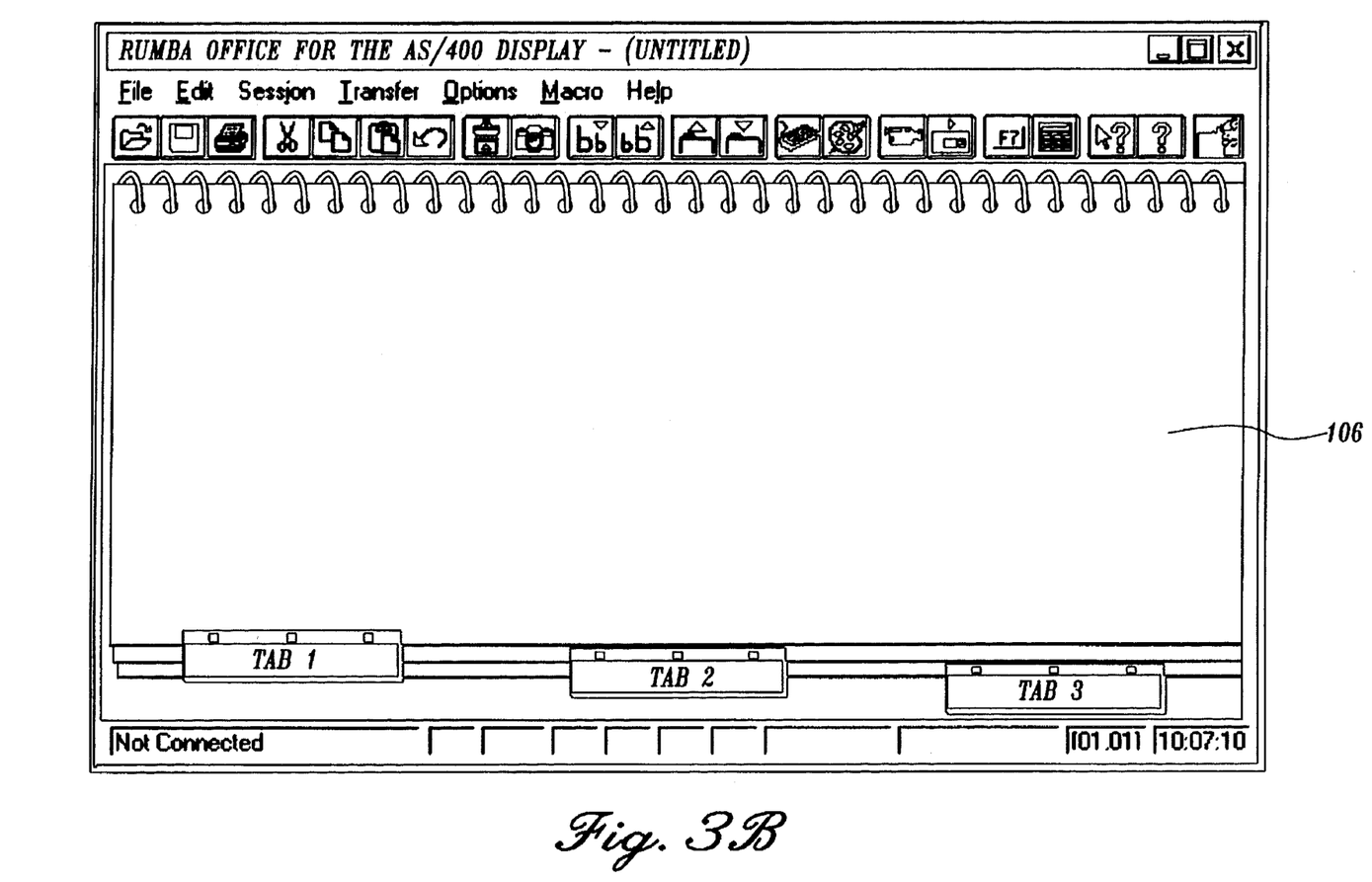
Figure 3C:
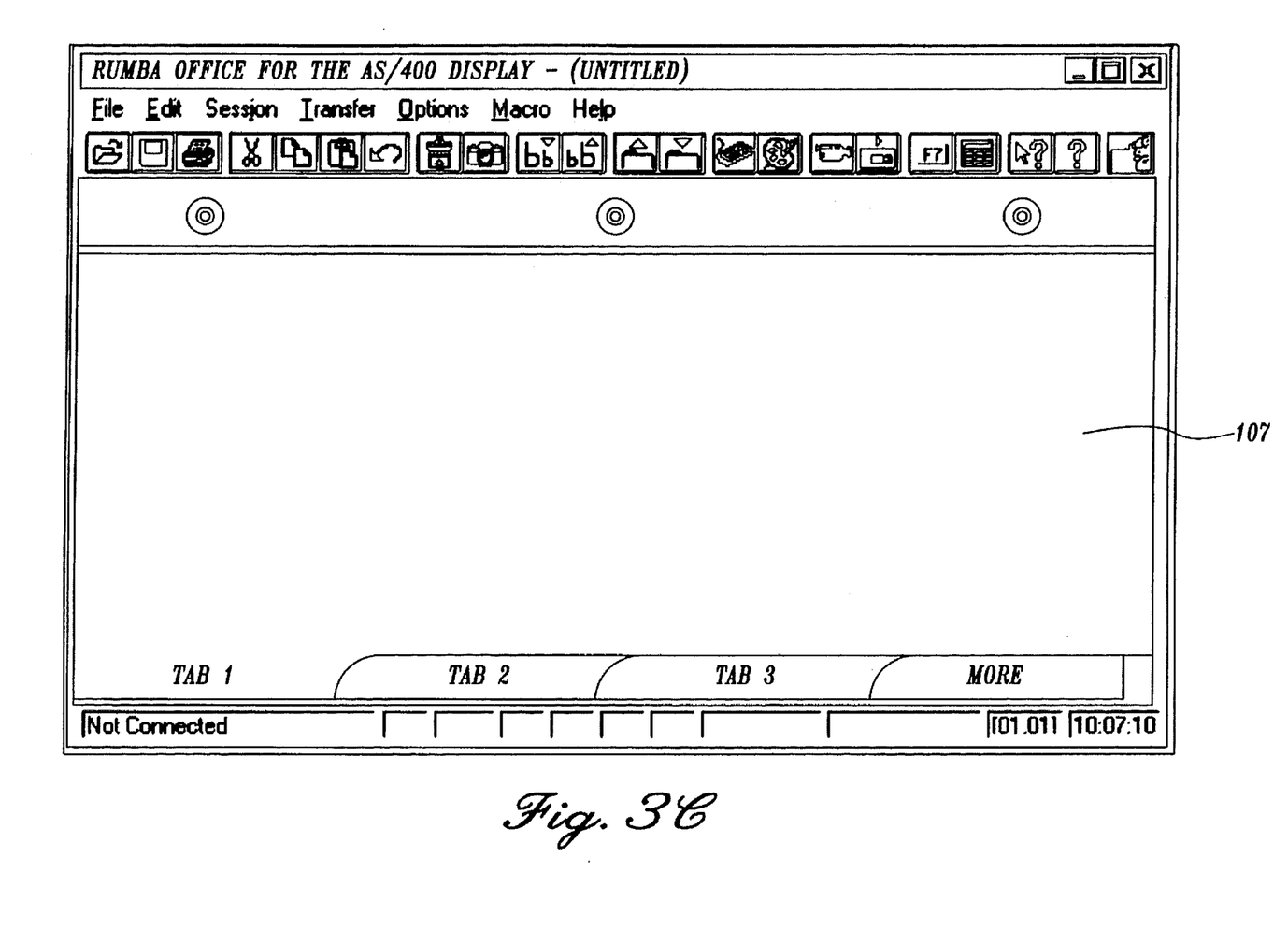
Figure 3D:
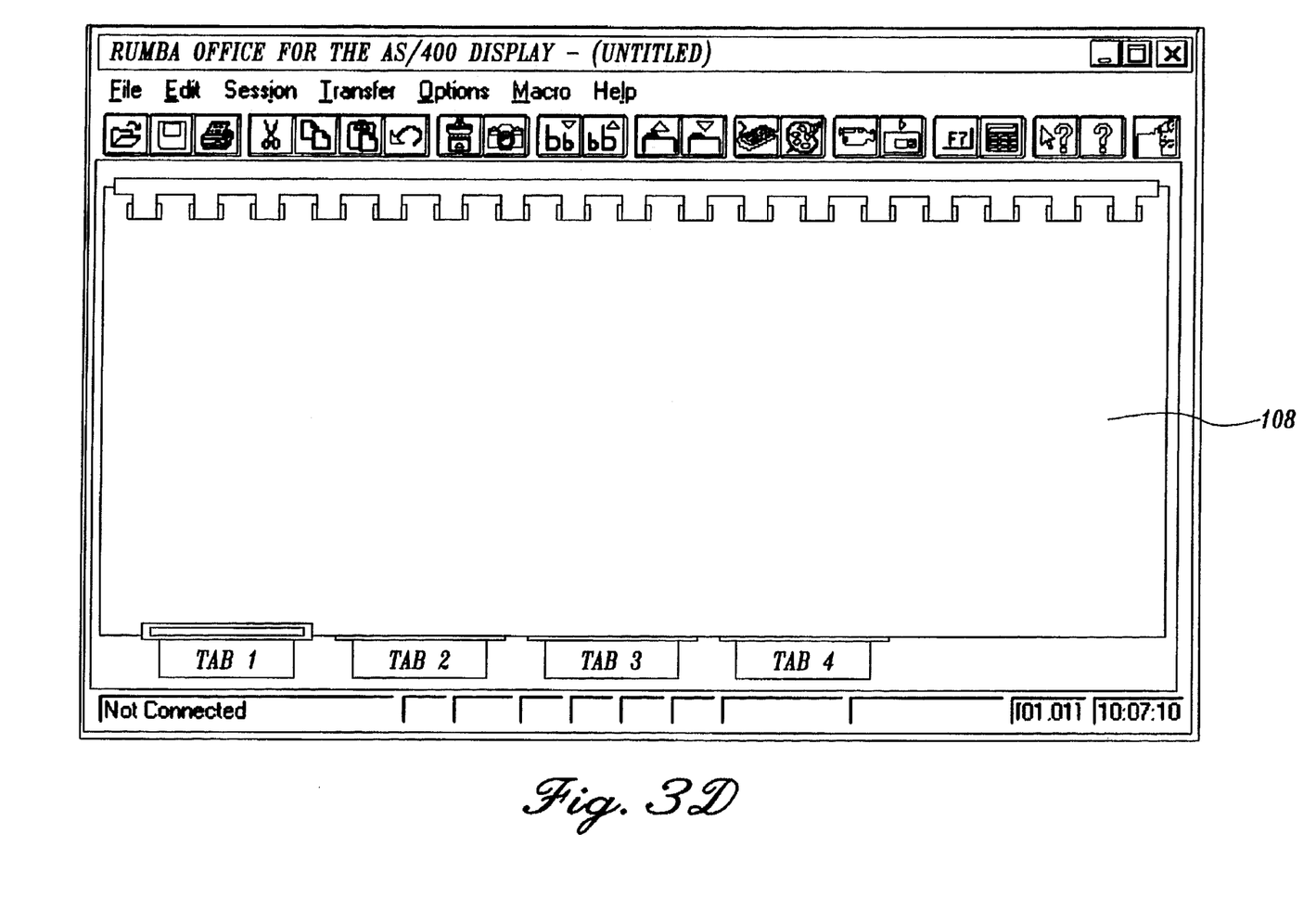

FIGS. 3C and 3D graphically show a third user definable feature of the notebook. This feature is the texture and color of the page paper. Various predetermined styles and colors are stored in the personal computer. Again, the user can adjust this feature by using a dragdown menu to select a predetermined cover and texture for the notebook.

The selection of these display features, such as notebook color, binder location, tab location, binder style, and the like, are not mandatory. Default displays are in place for the user that is not concerned with the personalization of the appearance of the notebook.

Figure 4:
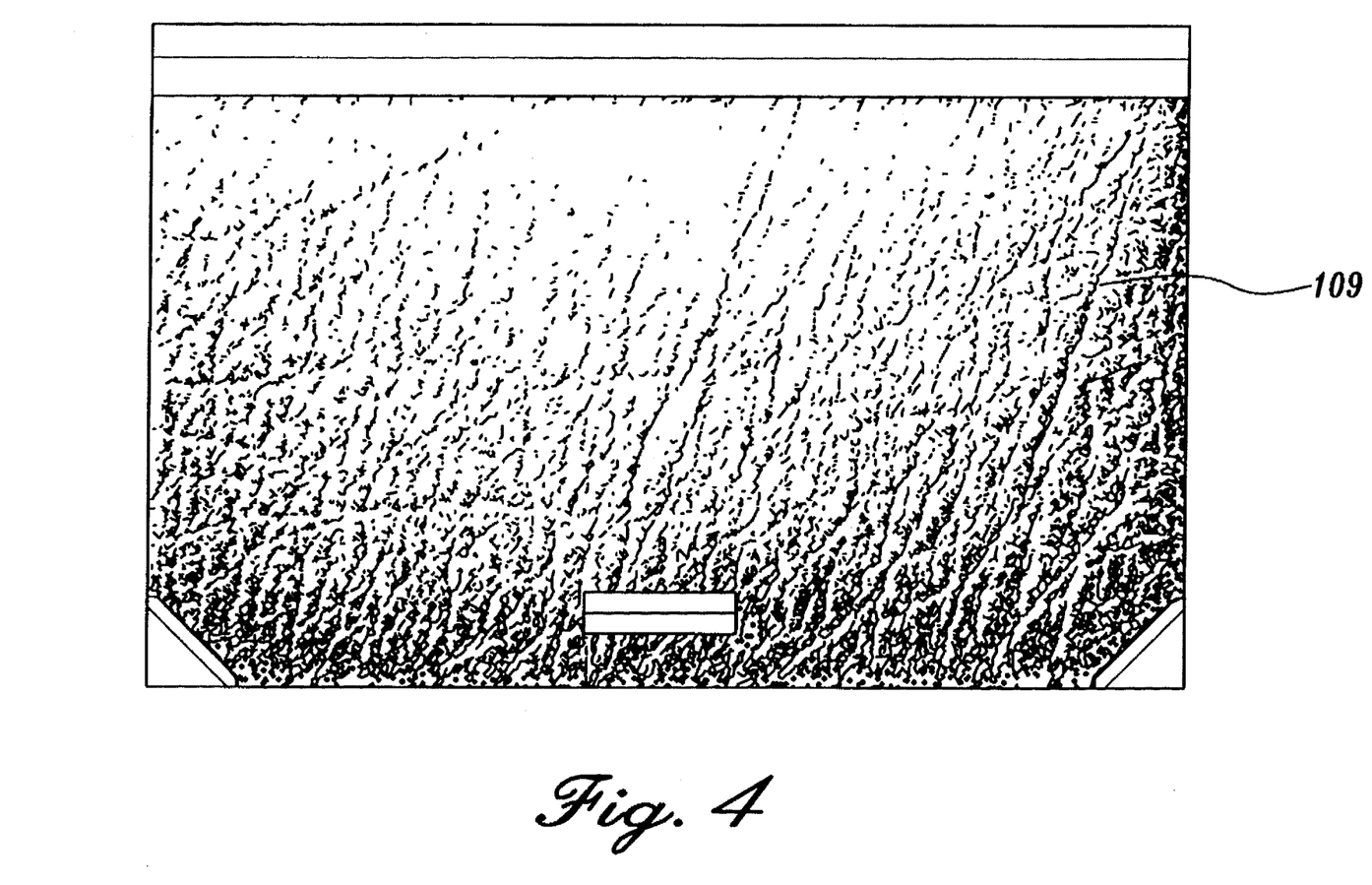
FIG. 4 is an example of a notebook cover formed in accordance with the present invention.

FIG. 4 is a graphical representation of a cover 109 of a notebook 100 in the present invention. When a single notebook is accessed, for example by double clicking the cursor on top of the icon that represents the notebook, the .next display that will appear is the cover of the notebook, as shown in FIG. 4. The window containing the pages of the notebook automatically follow several seconds after the cover, as shown in FIGS. 2 and 3A–3D.

Figure 5:
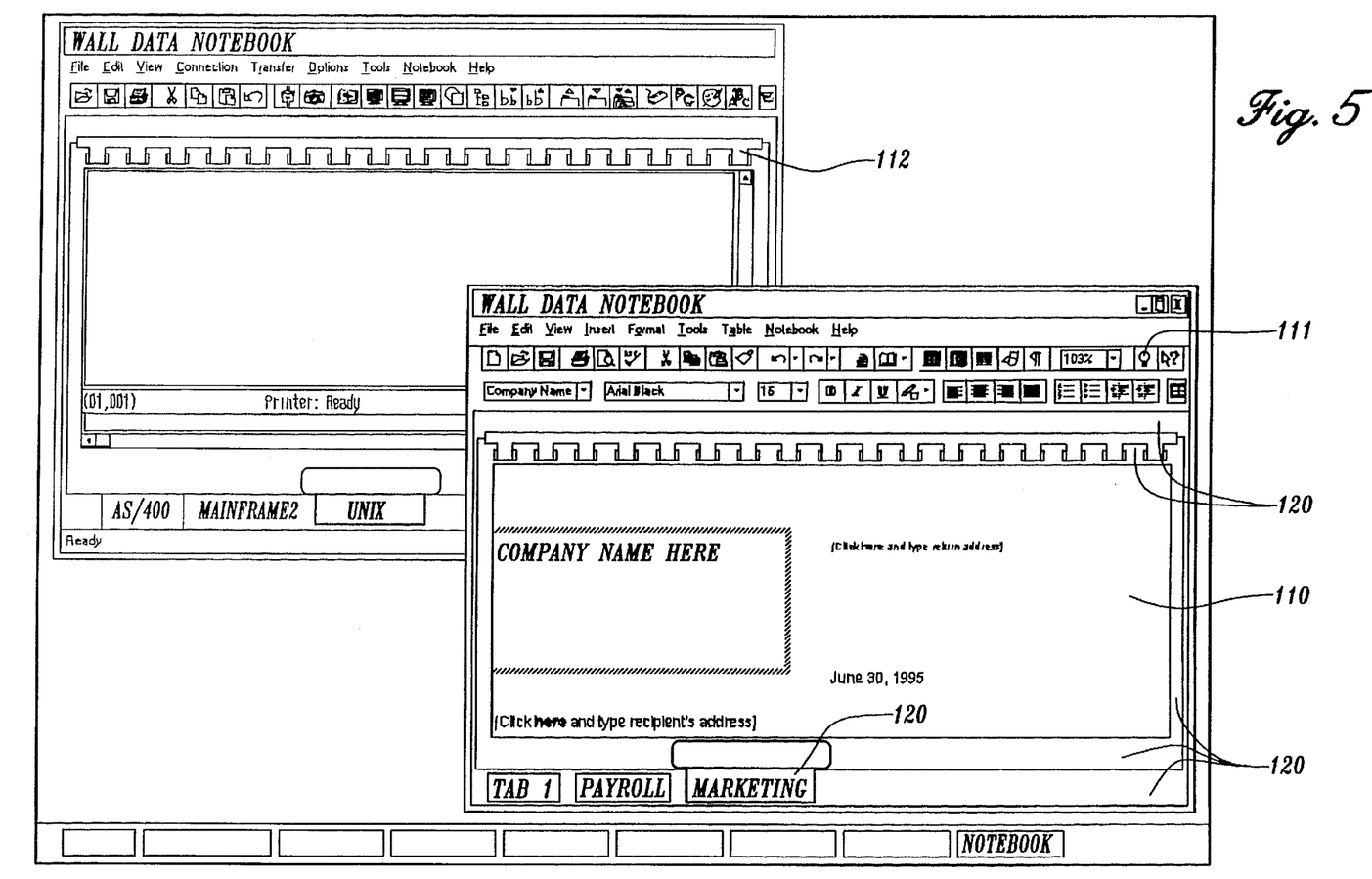
FIG. 5 is a screen display of two notebooks formed in accordance with the present invention running in a Windows™ environment.

FIG. 5 shows two distinctly different notebooks. The notebook that appears to be on top is the active notebook 111. The application within this notebook is the only application the user interacts with unless the user gives some other command to the computer such as clicking on the second notebook or accessing any of the other applications on the desktop. As noted above, in order to access the applications of the second notebook 112, that appears to be partially covered, the user would simply activate the cursor on its window.

In FIG. 5, an activation area 120 is where the user must activate the cursor in order to initiate a dragdrop operation. The dragdrop operation of the present invention allows a user to transfer one or more applications in one notebook to a second notebook. This dragdrop operation can be maintained even if the application being moved is still active. The dragdrop operation is activated if the cursor is positioned within the area 120 and is activated. If the cursor is activated over area 110, the cursor will begin interacting with the application that is running. If the cursor is activated over any one of the user interaction bars 104 (menu, tool, etc.), the system will interface with these bars in the same manner as it does in a standard Windows™ environment. Area 120 is also where the user must drop a dragged page in order for the page to be inserted into a notebook.

The following is the instruction protocol illustrating the dragdrop operation.

RUMBA Notebook Drag-Drop Transfer Protocol

The essential time line and responsibilities are as follows:
1. User initiates drag-drop operation
2. Source Notebook creates CLSD_DataTransferObject, putting at least a data item of type NOTEBOOK-PAGE, and begins the operation via a call to DoDragDrop
3. Target Notebook receives a call to DragDropWindow::CanUseDataObject, and queries the Data Object for the proper clipboard format (NOTEBOOK-PAGE). Assuming this is found, it returns TRUE, and the operation continues.
4. User releases the primary mouse button over the Target Notebook
5. Target Notebook receives a call to DragDrop Window::PasteDataObject
   a. Call DataObject::QueryInterface, asking for PageDataObject. Assuming this is returned, save the pointer
   b. Call PageDataObject::SetTargetWindow to store its window identifier (HWND)
   c. Return TRUE
6. Source Notebook returns from DoDragDrop call with DROPEFFECT-MOVE.
   a. Call DataObject::QueryInterface, asking for PageDataObject; assuming it is returned, save it
   b. Call PageDataObject::SetSourceWindow to save its window identifier (HWND)
   c. Call NotePage::PreparePageForTransfer to ask the notepage to:
      i. Get the label of the active tab ii. Query the active object for its Object pointer and call PageDataObject::SetObjectInfo, passing the Object pointer and the label.
    iii. Call the active object's PersistStorage::HandsOffStorage
    iv. Ask the server to deactivate itself; moving the server from the Running to the Loaded state.
    v. Ask the site to call Object::SetClientSite now
    vi. Tell the site object to not call Object::Close when it gets deleted
  d. Call PageDataObject::QueryTargetWindow
  e. Set a time-out timer in case the Target Notebook doesn't respond to the INTEGRATE-OBJECT message
  f. Post a INTEGRATE-OBJECT message to the Target Notebook
7. Target Notebook receives the INTEGRATE-OBJECT message and, using the PageDataObject pointer saved previously:
  a. Call NotePage::AddTab, passing the Object pointer. The NotePage would then:
    i. Call PageDataObject::QueryNotePageInfo to get the Object pointer and the tab's label
    ii. Call the "normal" AddTab implementation
    iii. Call CreateNewSite following essentially the same route as is currently implemented (i.e., create a new ClientSite object, etc...); At this point the object is fully inserted into the Target Notebook. Note that if this operation fails, it is the Target's responsibility to display an error message to the user.
  b. Call PageDataOject::QuerySourceWindow
  c. Release the PageDataObjectpointer
  d. Post a OBJECT-INTEGRATED message to the Source Notebook, passing either NOERROR or E-FAIL in WParam to indicate success or failure.
8. If Source Notebook receives the OBJECT-INTEGRATED message before the time-out timer expires:
  a. If NOERROR, then call NotePage::DeleleTab to finish the process of moving the page
  b. If E-FAIL, re-integrate the object into the Source Notebook via a call to NotePage::ReintegrateObject
9. If Source Notebook doesn't receive the OBJECT-INTEGRATED message, and the time-out timer expires:
  a. Display an error message to the user
  b. Re-integrate the object into the Source Notebook via a call to NotePage::ReintegrateObject The protocol above is represented in the flow chart of FIGS. 6–8. The steps listed are from this protocol and the box numbers are from FIGS. 6–8.

Figure 6:
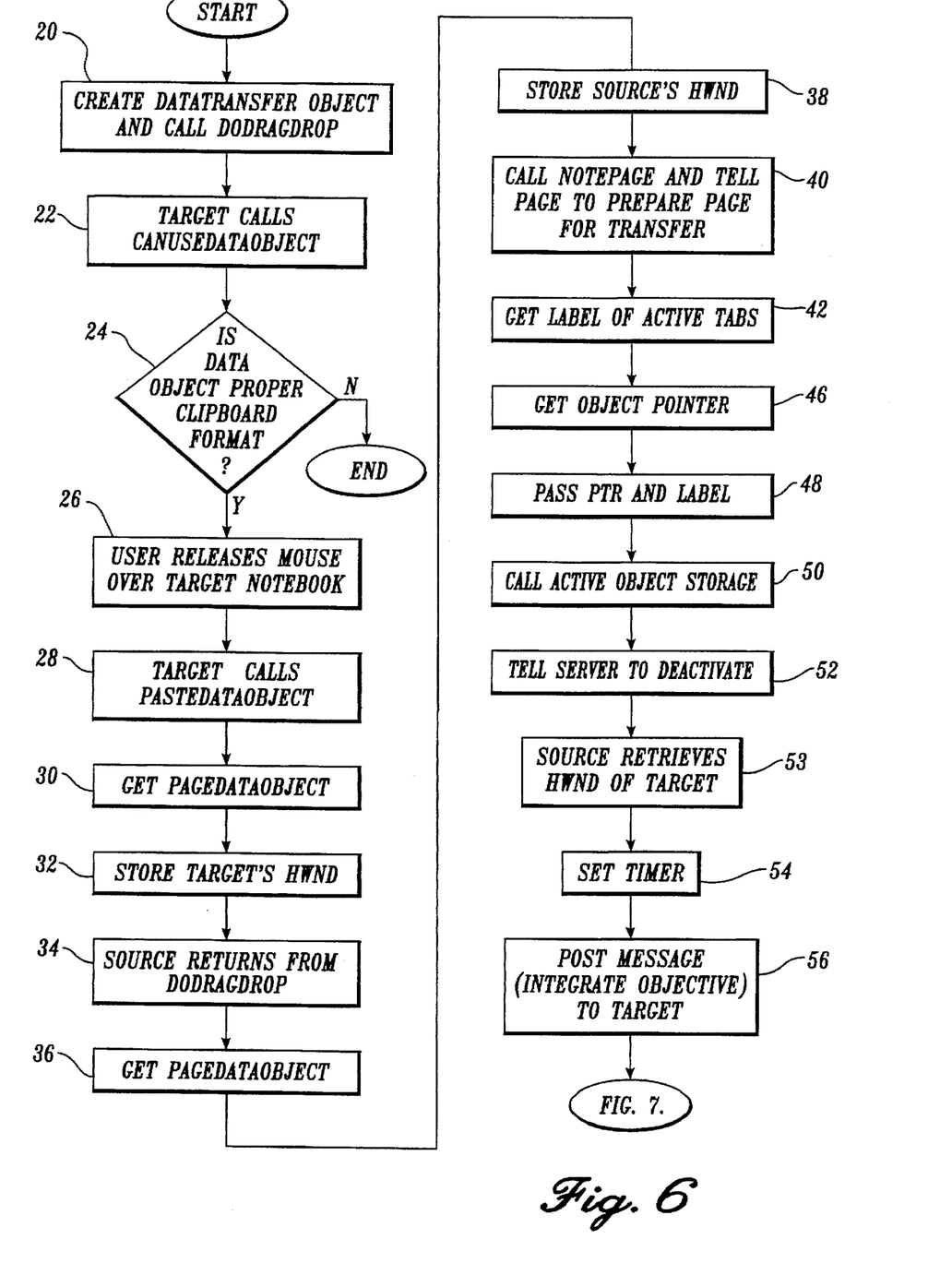
FIGS. 6–8 are flow diagrams that illustrate the present invention executing the drag-drop operation.
Figure 7:
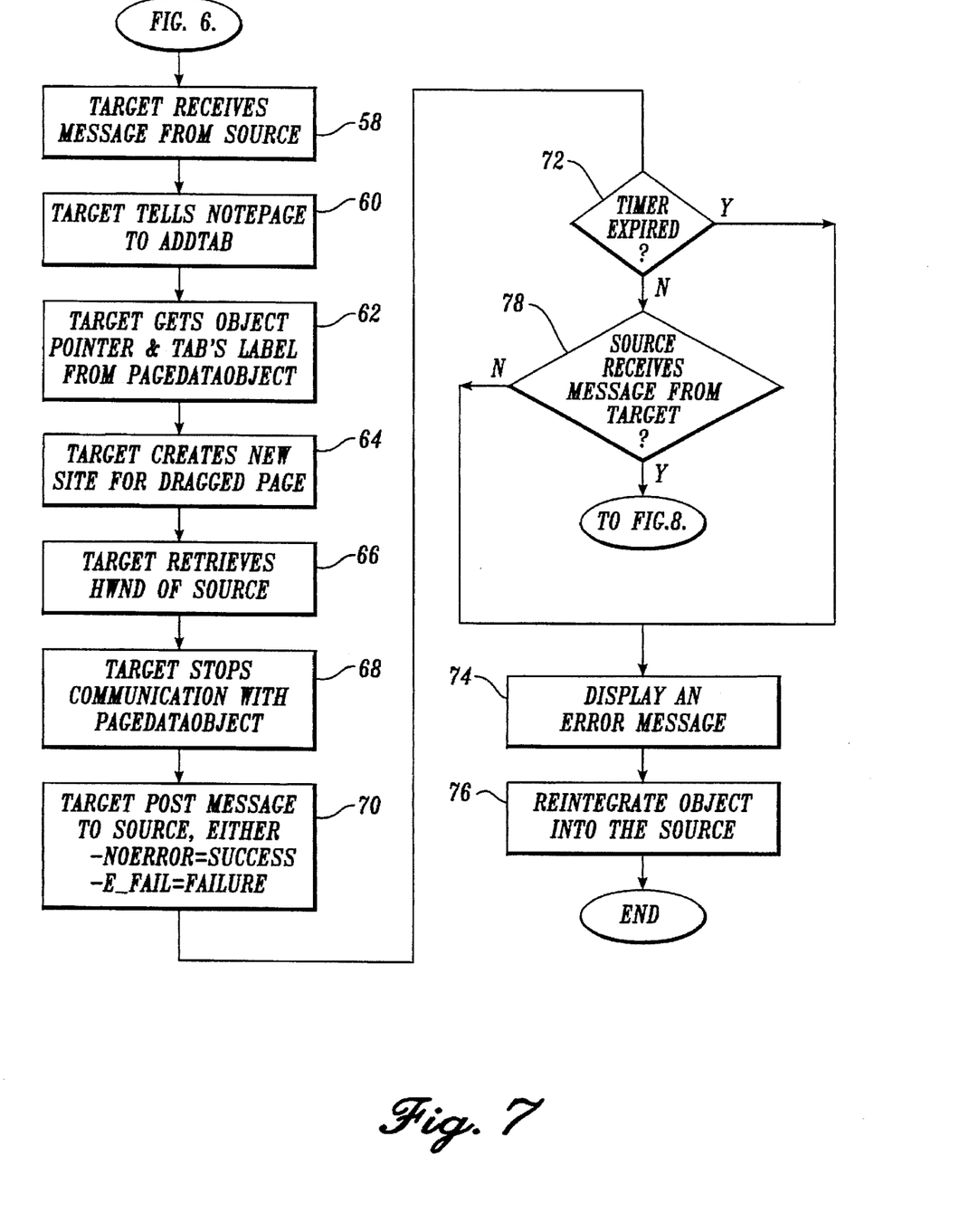
Figure 8:
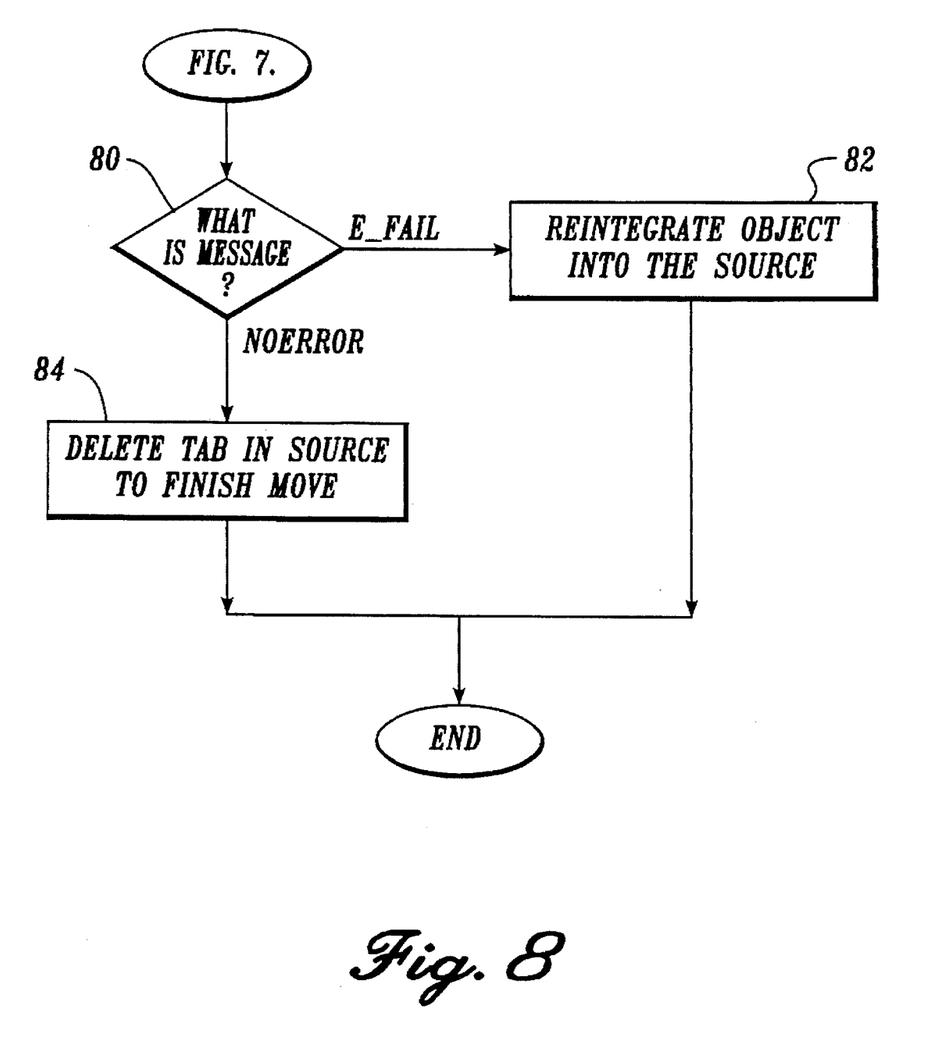

In the following description of the above protocol and FIGS. 6–8, the terms Target and Target Notebook and the terms Source and Source Notebook are interchangeable.

In Step 1 the user initiates the DragDrop operation by activating the cursor over the intended page to be transferred. Next in Step 2 at box 20, the Source Notebook creates the DataTransferObject using the class identifier (CLSID). The DataTransferObject is the tool that allows the Source and Target to communicate via a database internal to the DataTransferObject. The class identifier tells the DataTransferObject what type of data it contains, i.e. NOTEBOOK-PAGE. This identifies its clipboard format. This step is a standard creation step found in OLE 2.0™. Once this is complete, the DataTransferObject moves out of the Source and Source begins the DoDragDrop function.

In Step 3 at box 22, the Target Notebook calls CanUseDataObject and determines at box 24 if the DataTransferObject is of a usable format. It queries the DataTransferObject for its clipboard format. If it is not of usable format the cursor on the screen will indicate so and the drag operation will not continue. If it is determined that it is usable, then the protocol continues to Step 4 at box 26 which is the final user step of releasing the primary mouse button over the Target Notebook.

In Step 5 at box 28, the Target Notebook calls PasteDataObject function. This function begins the Target Notebook's initial communication with the database of the DataTransferObject herein referred to as PageDataObject. In Step 5a at box 30, Target Notebook asks for and gains access to PageDataObject. Next at box 32 the Target stores its window identifier (HWND as defined in the program) into the location allocated for the Target Window identifier. This is performed so the Source Notebook knows where its page information will later be sent. Once this is complete, Target Notebook sends the message (DROP EFFECT_MOVE).

At the beginning of Step 6 at box 34, the Source receives the message (DROP EFFECT_MOVE) that DoDragDrop worked successfully and can continue. In Step 6a at box 36 the Source Notebook asks for access to PageDataObject, similar to Step 5a. Next, similar to Step 5b, the Source Notebook gives its window identifier (HWND) to PageDataObject at box 38. Step 6c, at box 40, is where the NotePage of the Source Notebook prepares the page for transfer. The NotePage is the area of the Notebook that represents the page that contains the application.

Next, at box 42, the label of the active tab is retrieved. Further, at box 46, the object pointer of the active object is retrieved. Once this is complete, the label and the object pointer are passed to PageDataObject via the SetObjectInfo function at box 48. The Source then asks the active object for its HandsOffStorage at box 50. In Step 6c.iv, at box 52, the active object deactivates itself then gets expelled from the Source Notebook (Step 6c.v.). Step 6c.vi. is an internal safety measure designed to keep options open in case the DoDragDrop fails.

The Source Notebook then retrieves the Target Window data at box 53 that was entered in Step 5b. Once Step 6d is complete, Step 6 is functionally finished except for the posting of a message to the Target at box 56 and setting a time-out timer at box 54 which is done in case this message is never received.

Immediately after the Source posts the message, Target receives it for the beginning of Step 7 at box 58. The Target Notebook then creates a tab and retrieves the object pointer and tab label that were stored in PageDataObject at boxes 60, 62. Step 7a.ii. then creates a tab with this retrieved label. Then the Target Notebook creates a site for the active object at box 64. At this point the object is fully inserted into the Target Notebook. This creation step operates in functionally the same manner as a standard OLE insertion but varies with regards to the communication with the object pointer which is non existent in the standard OLE protocol. In Step 7b at box 66 the Target asks for the Source Window identifier which was entered in Step 6b. The Target Notebook then releases the object pointer in Step 7c at box 68 essentially stopping communication with the DataTransferObject. The Target Notebook then posts a message to the Source Notebook indicating whether the entire process was complete with or without any errors at box 70.

Step 8 at boxes 72,78 is performed if the Source receives the message from the Target prior to the timer expiring. If the message that the Target object sent indicated successful completion then the process is finished by deletion of the tab in the Source Notebook at box 84. If the message indicated failure reintegration of the page will take place in the Source Notebook at box 82. If the Source Notebook never receives the integrated message from the Target the timeout timer will expire and an error message will be displayed to the user at box 74. This will also initiate reintegration of the object into the Source Notebook at box 76.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of increasing the capabilities of an object, linking and embedding (OLE) graphical user interfaces (GUIs) in a GUI system, said GUI system including a personal computer consisting of a display, a user input device for control of a display cursor, and a central processing unit (CPU), said method including the steps of:
   (a) representing said GUI on said display as a first notebook consisting of at least one page with a tab, said page representing an OLE object of a loaded application;
   (b) initiating a drag-drop operation of a selected page of said first notebook by using said user input device;
   (c) dragging the selected page to a location outside of said notebook, said location of the selected page determined by the position of said cursor on said display;
   (d) releasing the dragged page onto an area outside of said first notebook and within a second notebook;
   (e) displaying the dragged page in said second notebook and removing the dragged page from said first notebook;
   (f) maintaining said first notebook as an active window; and
   wherein the step of releasing the dragged page further includes creating a new notebook containing the dragged page if the dragged page is released outside of the window's boundary of said first notebook and outside of a window of any other user created notebooks.

2. The method of claim 1, wherein said user input device is a mouse with an activating button.

3. The method of claim 1, further including the step of changing the style and location of the tab.

4. The method of claim 1, further including the step of displaying a notebook with a user definable binder style.

5. The method of claim 4, further including the step of changing the location of the binder of the notebook.

6. The method of claim 1, further comprising the step of changing the style of a notebook cover that appears for a brief period of time when a notebook is initially activated.

7. An apparatus for increasing the capabilities of an object, linking and embedding (OLE) graphical user interfaces (GUIs) in a GUI system, said GUI system including a personal computer consisting of a display, a user input device for control of a display cursor, and a central processing unit (CPU), said apparatus comprising:
   (a) means for representing said GUI on said display as a first notebook consisting of at least one page with a tab, said page representing an OLE object of a loaded application;
   (b) means for initiating a drag drop operation of a selected page of said first notebook by using said user input device;
   (c) means for dragging the selected page to a location outside of said first notebook, said location of the selected page determined by the position of the cursor on said display;
   (d) means for releasing the dragged page onto an area outside of said first notebook and within a second notebook;
   (e) means for displaying the dragged page in said second notebook and removing the dragged page from said first notebook;
   (f) means for maintaining said first notebook as an active window; and
   wherein the means of releasing the dragged page further comprises means for creating a new notebook containing the dragged page if the dragged page is released outside of the window's boundary of said first notebook and outside of a window of any other user created notebooks.

8. The apparatus of claim 7, wherein said user input device is a mouse with an activating button.

9. The apparatus of claim 7, further comprising: a means for changing the style and location of said tab.

10. The apparatus of claim 7, further comprising: means for displaying a binder of a notebook.

11. The apparatus of claim 10, further comprising: means for changing the style and location of said binder.

12. The apparatus of claim 7, further comprising: a means for changing a notebook cover that appears for a brief period of time when a notebook is initially activated.

13. A computer program product for increasing the capabilities of an object, linking and embedding (OLE) graphical user interfaces (GUIs) in a GUI system, said GUI system including a personal computer consisting of a display, a user input device for control of a display cursor, and a central processing unit (CPU), said computer program product comprising:
   (a) means for representing said GUI on said display as a first notebook consisting of at least one page with a tab, said page representing an OLE object of a loaded application;
   (b) means for initiating a drag drop operation of a selected page of said first notebook by using said user input device;
   (c) means for dragging the selected page to a location outside of said first notebook, said location of the selected page determined by the position of the cursor on said display;
   (d) means for releasing the dragged page onto an area outside of said first notebook and within a second notebook;
   (e) means for displaying the dragged page in said second notebook and removing the dragged page from said first notebook;
   (f) means for maintaining said first notebook as an active window; and
   wherein the means of releasing the dragged page further comprises means for creating a new notebook containing the dragged page if the dragged page is released outside of the window's boundary of said first notebook and outside of a window of any other user created notebooks.

14. The computer program product of claim 13, wherein said user input device is a mouse with an activating button.

15. The computer program product of claim 13, further comprising: a means for changing the style and location of said tab.

16. The computer program product of claim 13, further comprising: means for displaying a binder of a notebook.

17. The computer program product of claim 16, further comprising: means for changing the style and location of said binder.

18. The computer program product of claim 13, further comprising: a means for changing a notebook cover that appears for a brief period of time when a notebook is initially activated.

* * * * *

UNITED STATES PATENT AND TRADEMARK OFFICE
CERTIFICATE OF CORRECTION

| | |
|---|---|
| PATENT NO. : | 5,668,964 |
| DATED : | September 16, 1997 |
| INVENTOR(S) : | B.L. Helsel et al. |

It is certified that error appears in the above-identified patent and that said Letters Patent is hereby corrected as shown below:

| COLUMN | LINE | |
|---|---|---|
| Title page, item [56], col. 1 | Refs. Cited (U.S. Pat. Docs., Item 10) | "5,420,040" should read --5,542,040-- |
| item [56] col. 2 | Refs. Cited (Other Publs., Item 1) | After "141-144" insert --,-- |
| item [56] col. 2 | Refs. Cited (Other Publs., Item 3) | After "Corporation" insert --,-- |
| 7 (Claim 1, | 11 line 6) | "(CPLD," should read --(CPU),-- |

UNITED STATES PATENT AND TRADEMARK OFFICE
CERTIFICATE OF CORRECTION

PATENT NO. : 5,668,964
DATED : September 16, 1997
INVENTOR(S) : B.L. Helsel et al.

It is certified that error appears in the above-identified patent and that said Letters Patent is hereby corrected as shown below:

| COLUMN | LINE | |
|---|---|---|
| 7 (Claim 6, | 43 line 2) | "style .of" should read --style of-- |

Signed and Sealed this

Tenth Day of February, 1998

Attest:

BRUCE LEHMAN

Attesting Officer

Commissioner of Patents and Trademarks